United States Patent Office 3,299,113
Patented Jan. 17, 1967

3,299,113
BRANCHED SILOXANE-ALKYLENE OXIDE
COPOLYMERS
Loren A. Haluska, Midland, Mich., assignor to Dow
Corning Corporation, Midland, Mich., a corporation
of Michigan
No Drawing. Filed Dec. 3, 1962, Ser. No. 241,551
1 Claim. (Cl. 260—448.8)

This invention relates to siloxane-alkylene oxide copolymers containing unsubstituted silicon atoms.

It is the object of this invention to prepare novel organosiloxane-alkylene oxide copolymers which are particularly useful as cell control agents in polyurethane foams.

This invention relates to a composition consisting essentially of (1) a siloxane moiety composed of a copolymer of $SiO_2$ units and dimethylsiloxane units in which the mol ratio of $SiO_2$ to dimethylsiloxane units is from 1:20 to 1:50 and (2) polyalkylene oxide moieties of the formula $-(RO)_nCH(CH_2OCH_3)_2$ in which R is an alkylene radical from 2 to 3 carbon atoms, $n$ is an integer from 20 to 65, in the $(RO)_n$ chain the ratio of ethylene oxide units to propylene oxide units being such that the C—O ratio is from 2.3:1 to 2.8:1, (1) and (2) being interconnected by SiOC linkages in which the carbon is a carbon atom of an alkylene oxide unit, there being on the average of four alkylene oxide moieties attached to the siloxane moiety, and there being in said composition from 15 to 40 percent by weight of (1) and from 60 to 85 percent by weight of (2) based on the combined weights of (1) and (2).

As can be seen the compositions of this invention are composed of a siloxane moiety (1) which in turn is composed of $SiO_2$ units, in which units each silicon atom has four oxygen atoms attached thereto and dimethylsiloxane units in which the silicon atoms have two methyl groups and two oxygen atoms attached thereto. For the purpose of this invention the ratio of the $SiO_2$ units to the dimethylsiloxane units must range from 1 to 20 to 1 to 50.

The siloxane moiety (1) is derived from siloxanes having an average of four silicon-bonded chlorine atoms per molecule. These siloxanes are best prepared by reacting silicon tetrachloride with cyclic dimethylsiloxanes. During the reaction, one or more of the chlorine atoms on the silicon tetra-chloride are reacted with the dimethylsiloxane cyclics to produce polymers having any one or any combination of the following configurations:

$$Cl_3Si(OSi)_mCl,\ Cl_2Si[(OSi)_mCl]_2,\ ClSi[OSi)_mCl]_3\ or\ Si[(OSi)_mCl]_4.]$$
(with $Me_2$ on each Si)

In these polymers the value of $m$ in any particular segment can vary widely, but for the purpose of this invention the total value of $m$ in any particular siloxane should range from 20 to 50. That is there are from 20 to 50 $Me_2SiO$ units for each $SiO_2$ unit.

These chlorine-endblocked branched siloxane fluids are then reacted with an alkylene oxide copolymer of the formula $HO(RO)_nCH(CH_2OCH_3)_2$ in the presence of a hydrogen halide acceptor, whereby the hydroxyl of the alkylene oxide copolymer reacts with the silicon-bonded chlorine causing alkylene oxide moieties to become attached to the silicon through a SiOC linkage. The reaction can be illustrated schematically by the equation $$-\overset{|}{C}OH + Cl\overset{|}{Si}- \longrightarrow -\overset{|}{Si}O\overset{|}{C}- + HCl$$

It should be understood that the product can be made up of molecules having any of the configurations shown below:

$$[(MeOCH_2)_2CH(OR)_nO]_3Si(O\overset{Me_2}{\underset{|}{Si}})_m(OR)_nOCH(CH_2OMe)_2,$$

$$[MeOCH_2)_2CH(OR)_nO]_2Si[(O\overset{Me_2}{\underset{|}{Si}})_mO(RO)_nCH(CH_2OMe)_2]_2,$$

$$(MeOCH_2)_2CH(OR)_nOSi[(O\overset{Me_2}{\underset{|}{Si}})_mO(RO)_nCH(CH_2OMe)_2]_3\ and$$

$$Si[(O\overset{Me_2}{\underset{|}{Si}})_mO(RO)_nCH(CH_2OMe)_2]_4$$

Thus, the products can contain one of these configurations or mixtures of two or more thereof.

The alkylene oxide copolymers employed herein are standard articles of commerce and are prepared by well known commercial techniques. For the purpose of this invention the total number of alkylene oxide units, i.e., RO units in the copolymer chain, should be from 20 to 65 and the ratio of ethylene oxide units to propylene oxide units in $(RO)_n$ chain should be such that the C to O ratio ranges from 2.3:1 to 2.8:1 inclusive.

The reaction between the chlorine-endblocked siloxane fluid and the alkylene oxide copolymer can be carried out in the presence of any suitable hydrogen halide acceptor such as amines such as pyridine, $\alpha$-picoline, trimethylamine and the like. For efficiency this reaction is best carried out in the presence of an aromatic hydrocarbon solvent such as benzene, toluene or xylene.

The preparation of the chlorine-endblock fluid is best carried out in the presence of a catalyst. The preferred catalysts are quaternary ammonium halides such as dioctadecyldimethyl ammonium chloride, tetra-decyl ammonium chloride or benzyltrioctadecyl ammonium chloride. If desired, a polar solvent can be employed to facilitate the reaction. However, in lieu of a polar solvent one can carry out the reaction at a higher temperature. Preferably, the reaction is carried out at a temperature of between 70 to 150° C. or higher.

The compositions of this invention are useful as cell control additives in polyurethane foams of any type. This includes both the polyether and polyester polyurethanes and both the flexible and rigid foams made from these polymers. The compositions are also effective in both the "one shot" method of producing foams and the two-step method. They are particularly useful in connection with the so-called one-shot flexible polyurethane foams.

As is well known, the polyurethane foams are prepared by reacting an organic isocyanate having at least two isocyanate groups per molecule with a polyether or polyester resin containing at least two hydroxyl groups per molecule. Preferably the polyesters are reaction products of aliphatic dihydric or polyhydric alcohols and aliphatic dicarboxylic acids or hydroxylated monocarboxylic acids. In these materials the hydroxyl groups can appear on the end of the chain by using an excess of the alcohol. The hydroxyl groups may also appear along the polyester chain by employing polyfunctional alcohols such as glycerin, pentaerythritol, trimethylolpropane or trimethylolethane. Also the hydroxyl groups may be in the acidic fragment of the polymer by employing hydroxylated acids or by employing glycerides of hydroxylated acids such as castor oil. For the purpose of this invention the basic composition of the polyester is not critical nor is the degree of hydroxylation.

The preferred base polymers are the hydroxylated polyethers which for the purpose of this invention can be any of those normally employed in the production of polyurethane polymers. These ethers are particularly described in U.S. Patent 2,948,691. The composition of the polyether is not critical for the purpose of this invention, although it is preferred that the material have a molecular weight of at least 500. In general, the polyethers are reaction products of alkylene oxides such as ethylene oxide, propylene oxide and butylene oxide with alcohols or water. The polyether may also contain some copolymerized polyhydric alcohol such as those described above.

For the purpose of this invention, any isocyanate having at least two isocyanate groups per molecule is suitable. These include aliphatic isocyanates such as hexamethylenediisocyanate; cycloaliphatic isocyanates such as cyclohexyl diisocyanate and aromatic isocyanates such as naphthalene 1,5-diisocyanate, toluene diisocyanate, 4,4'-diphenylmethane diisocyanate,

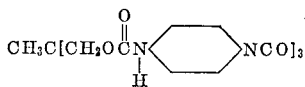

and 4.4'-diphenyl diisocyanate. If desired, the isocyanates can be employed in molar excess with respect to the OH groups in the polyether so that excess isocyanate groups provide the gas for foaming the product.

Any of the catalysts normally employed in preparing polyurethane foams are operative in this invention. These include, for example, metallic compounds such as dibutyltin dilaurate, dibutyltin diacetate or stannous octoate and amines, such as triethylamine, tributylamine and triethylendiamine. Mixtures of two or more catalysts can be used if desired.

The foams of this invention can be prepared employing any blowing agent. In many foams the blowing agent is the evolved $CO_2$ which results from the reaction of the isocyanate with $H_2O$. However, in other foams it is preferable to employ volatile fluids such as fluoromethanes and ethanes generally sold under the name Freon. However, the process of this invention is not restricted to these types of agents. In the former case the water acts as the blowing agent for the purpose of this invention.

The precise amount of the instant compositions needed to produce the optimum foam varies with the particular polyurethane formulation. However, in general satisfactory foams are obtained employing from .1 to 2 percent by weight of the instant compositions based on the total weight of the polyurethane composition. The foams employing the compositions of this invention are characterized by excellent foam height and cell structure.

The following examples are illustrative only and should not be construed as limiting the invention which are properly delineated in the appended claim.

Example 1

778.5 g. of a mixture of cyclic dimethylsiloxane containing about 80 percent by weight octamethylcyclotetrasiloxane, 63.7 g. of silicon tetrachloride, 8.4 g. of dioctadecyldimethylammonium chloride catalyst and 126.3 g. of acetonitrile were mixed and heated at a temperature of 80 to 83° C. for 72 hours. The product was strip distilled by heating up to 150° C. at 2 mm. to remove solvent and volatiles and cooled and the catalyst was filtered off. The fluid residue contained 5.82 percent by weight chlorine and had a viscosity of 21.9 cs. In this chlorine endblocked fluid the ratio of unsubstituted silicon atom to dimethyl-substituted silicon atoms was 1 to 28.

149.7 g. of the compound $$HO(C_2H_4O)_{17}(C_3H_6O)_{13}CH(CH_2OCH_3)_2$$

343 g. of toluene and 9.9 g. of pyridine were mixed and there was added thereto 48.6 g. of the above chlorine-endblocked siloxane fluid at a temperature about 25° C. over a period of 2 minutes. The reaction mixture was stirred one hour, filtered to remove the pyridine hydrochloride and strip distilled to remove solvents and volatiles. The product was a water-soluble fluid which contained 23.45 percent by weight siloxane.

Example 2

682 g. of mixed dimethylcyclosiloxanes, 34 g. of silicontetrachloride, 7.2 g. of the catalyst of Example 1, and 108 g. of acetonitrile were heated at 82 to 83° C. for 20 hours. The reaction product was stripped by heating up to 147° C. at 4 mm. and was filtered to remove the solvent. The fluid residue contained 4.6 percent by weight silicon-bonded chlorine and had a viscosity of 26.5 cs. at 25° C. In this fluid the ratio of unsubstituted silicon atom to dimethyl-substituted silicon atoms is 1 to 46.

149.7 g. of the alkylene-oxide copolymer of Example 1, 343 g. of toluene and 9.9 g. of pyridine were mixed and there was added thereto 61.4 g. of the above chlorine-endblocked fluid at a temperature of 26 to 28° C. over a period of 3 minutes. The mixture was stirred for one hour and the product was filtered to remove the pyridine hydrochloride and strip distilled by heating up to 172° C. at .1 mm. The product was a water-soluble fluid containing 28 percent by weight siloxane.

Example 3

A mixture of 778.5 g. of mixed dimethylcyclosiloxanes, 63.7 g. of silicon-tetrachloride and 8.4 g. of the catalyst of Example 1 were heated with stirring at 143° C. for 19 hours. After cooling the product was filtered and strip distilled by heating up to 180° C. at .65 mm. The residue was a fluid containing 6.1 percent by weight chlorine and having a viscosity of 14.1 cs. at 25° C. In this chlorine-endblocked fluid the ratio of unsubstituted silicon to dimethyl-substituted silicon was 1 to 28.

46.4 g. of this chlorine-endblocked fluid was reacted with 149.7 g. of the alkylene oxide copolymer of Example 1 in 343 g. of toluene and in the presence of 9.9. g. of pyridine in accordance with the procedure of Example 1. The product was a water-soluble fluid containing 22.8 percent by weight siloxane.

Example 4

Each of the products of Examples 1 to 3 were tested as a cell control additive in the following polyurethane foam composition:

50 g. of a polyether triol having a molecular weight of 3,000,
.7 g. of the silicone product,
.27 cc. of dibutyltindilaurate,
.055 g. of triethylamine,
1.7 cc. of distilled water were mixed with a mechanical stirrer for 20 seconds at 5600 r.p.m.,
14.5 cc. of toluene diisocyanate was then added and the mixture was stirred with a mechanical stirrer for 15 seconds at 5600 r.p.m.

The mixture was then allowed to foam.

In each case, the products of Examples 1, 2 and 3 gave a foam having excellent height and good cell structure showing that they are satisfactory commercial cell control foam additives.

That which is claimed is:

A composition each molecule of which consists essentially of (1) a siloxane moiety composed of a copolymer of a $SiO_{4/2}$ unit and dimethylsiloxane units in which the mol ratio of $SiO_{4/2}$ to dimethylsiloxane units is from 1:20 to 1:50 and (2) polyalkylene oxide moieties of the formula $-(RO)_nCH(CH_2OCH_3)_2$ in which R is an alkylene radical of 2 to 3 inclusive carbon atoms, $n$ is an integer from 20 to 65 inclusive, in the $(RO)_n$ chain the being such that the C—O ratio is from 2.3:1 to 2.8:1 (1) and (2) being interconnected through SiOC linkages in which the carbon is a part of an alkylene oxide unit and the silicon is a part of (1), there being on the average four alkylene oxide moieties attached to (1) and there being in said composition from 15 to 40 percent by weight of (1) and 60 to 85 percent by weight of (2) based on the combined weights of (1) and (2).

References Cited by the Examiner

UNITED STATES PATENTS

| | | | |
|---|---|---|---|
| 2,834,748 | 5/1958 | Bailey et al. | 260—448.8 |
| 2,917,480 | 12/1959 | Bailey et al. | 260—44.8 |
| 3,065,252 | 11/1962 | Brown et al. | 260—448.8 |
| 3,115,512 | 12/1963 | Rossmy | 260—448.8 |

HELEN M. McCARTHY, *Acting Primary Examiner.*

SAMUEL H. BLECH, *Examiner.*

PAUL F. SHAVER, *Assistant Examiner.*

UNITED STATES PATENT OFFICE
CERTIFICATE OF CORRECTION

Patent No. 3,299,113                          January 17, 1967

Loren A. Haluska

It is hereby certified that error appears in the above numbered patent requiring correction and that the said Letters Patent should read as corrected below.

Column 1, lines 48 and 49, the last two formulas should appear as shown below instead of as in the patent:

column 2, lines 8 and 9, for that portion of the formula reading

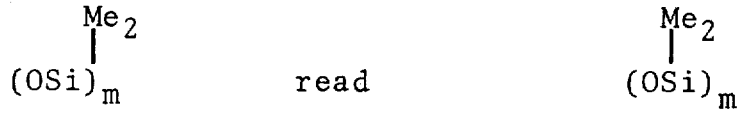

column 3, line 29, for "4.4′-diphenyl" read -- 4,4′-diphenyl --; column 5, line 3, after "chain the" insert -- ratio of ethylene oxide units to propylene oxide units --.

Signed and sealed this 24th day of October 1967.

(SEAL)
Attest:

EDWARD M. FLETCHER, JR.                      EDWARD J. BRENNER
Attesting Officer                             Commissioner of Patents